United States Patent [19]

Abdoo et al.

[11] Patent Number: 5,490,155
[45] Date of Patent: Feb. 6, 1996

[54] ERROR CORRECTION SYSTEM FOR N BITS USING ERROR CORRECTING CODE DESIGNED FOR FEWER THAN N BITS

[75] Inventors: David G. Abdoo, Foutain Hill, Ariz.; J. David Cabello, Houston, Tex.

[73] Assignee: Compaq Computer Corp., Houston, Tex.

[21] Appl. No.: 955,923

[22] Filed: Oct. 2, 1992

[51] Int. Cl.⁶ .............................. G06F 11/10; G11C 29/00
[52] U.S. Cl. ................................................. 371/40.1
[58] Field of Search .................................. 371/37.1, 37.2, 371/37.6, 40.1, 40.2, 40.3

[56] References Cited

U.S. PATENT DOCUMENTS

| | | | |
|---|---|---|---|
| 4,201,337 | 5/1980 | Lewis et al. | 371/37 |
| 4,993,028 | 2/1991 | Hillis | 371/39.1 |
| 5,206,865 | 4/1993 | Gruender, Jr. et al. | 371/40.1 |

OTHER PUBLICATIONS

D. C. Bossen, B–Adjacent Error Correction, IBM J. Res. Develop., Jul. 1970, pp. 402–408.
Wortzman, D., "Two Tier Error Correcting Code for Memories", *IBM Technical Disclosure Bulletin*, vol. 26, No. 10A, Mar. 1984, pp. 5314–5318.
Rao, T. et al., *Error–Control Coding for Computer Systems*, Prentice–Hall, 1988, pp. 221–298.

*Primary Examiner*—Stephen M. Baker
*Attorney, Agent, or Firm*—Pravel, Hewitt, Kimball & Krieger

[57] ABSTRACT

A computer system includes an error detection and correction system for detecting and correcting single-bit errors, two-adjacent-bit errors, and four-adjacent-bit errors. Two identical error detection and correction (EDC) circuits are connected to the system memory array, and each EDC circuit is connected to half of the data bits in alternating pairs. Each EDC circuit detects single-bit errors and two-adjacent-bit errors. The EDC circuits are connected to alternating pairs of data bits so that errors of up to four adjacent bits are actually detected and corrected, two bits by the first EDC circuit and two bits by the second. Thus, if one of the x4 DRAMs in a memory array fails, each erroneous data bit from the DRAM is corrected to its original value, and the failure of the DRAM is registered.

7 Claims, 10 Drawing Sheets

| 1st SDB CHIP HOST DATA | | NOMENCLATURE ON SDB CHIP | | 2nd SDB CHIP HOST DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |
| 32 | 33 | 16 | 17 | 34 | 35 |
| 36 | 37 | 18 | 19 | 38 | 39 |
| 40 | 41 | 20 | 21 | 42 | 43 |
| 44 | 45 | 22 | 23 | 46 | 47 |
| 48 | 49 | 24 | 25 | 50 | 51 |
| 52 | 53 | 26 | 27 | 54 | 55 |
| 56 | 57 | 28 | 29 | 58 | 59 |
| 60 | 61 | 30 | 31 | 62 | 63 |

FIG. 3A

| 1st SDB CHIP EISA DATA | | NOMENCLATURE ON SDB CHIP | | 2nd SDB CHIP EISA DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |

FIG. 3B

| 1st SDB CHIP MEMORY DATA | | NOMENCLATURE ON SDB CHIP | | 2nd SDB CHIP MEMORY DATA | |
|---|---|---|---|---|---|
| 0 | 1 | 0 | 1 | 2 | 3 |
| 4 | 5 | 2 | 3 | 6 | 7 |
| 8 | 9 | 4 | 5 | 10 | 11 |
| 12 | 13 | 6 | 7 | 14 | 15 |
| 16 | 17 | 8 | 9 | 18 | 19 |
| 20 | 21 | 10 | 11 | 22 | 23 |
| 24 | 25 | 12 | 13 | 26 | 27 |
| 28 | 29 | 14 | 15 | 30 | 31 |
| 32 | 33 | 16 | 17 | 34 | 35 |
| 36 | 37 | 18 | 19 | 38 | 39 |
| 40 | 41 | 20 | 21 | 42 | 43 |
| 44 | 45 | 22 | 23 | 46 | 47 |
| 48 | 49 | 24 | 25 | 50 | 51 |
| 52 | 53 | 26 | 27 | 54 | 55 |
| 56 | 57 | 28 | 29 | 58 | 59 |
| 60 | 61 | 30 | 31 | 62 | 63 |
| 64 | 65 | 32 | 33 | 66 | 67 |
| 68 | 69 | 34 | 35 | 70 | 71 |
| 72 | 73 | 36 | 37 | 74 | 75 |
| 76 | 77 | 38 | 39 | 78 | 79 |
| 80 | 81 | 40 | 41 | 82 | 83 |
| 84 | 85 | 42 | 43 | 86 | 87 |
| 88 | 89 | 44 | 45 | 90 | 91 |
| 92 | 93 | 46 | 47 | 94 | 95 |
| 96 | 97 | 48 | 49 | 98 | 99 |
| 100 | 101 | 50 | 51 | 102 | 103 |
| 104 | 105 | 52 | 53 | 106 | 107 |
| 108 | 109 | 54 | 55 | 110 | 111 |
| 112 | 113 | 56 | 57 | 114 | 115 |
| 116 | 117 | 58 | 59 | 118 | 119 |
| 120 | 121 | 60 | 61 | 122 | 123 |
| 124 | 125 | 62 | 63 | 126 | 127 |
| CHECK BITS | | CHECK BITS | | CHECK BITS | |
| 0 | | 0 | | 0 | |
| 1 | | 1 | | 1 | |
| 2 | | 2 | | 2 | |
| 3 | | 3 | | 3 | |
| 4 | | 4 | | 4 | |
| 5 | | 5 | | 5 | |
| 6 | | 6 | | 6 | |
| 7 | | 7 | | 7 | |

| SSSS 3210 | 0000 | 0001 | 0010 | 0011 | 0100 | 0101 | 0110 | 0111 | 1000 | 1001 | 1010 | 1011 | 1100 | 1101 | 1110 | 1111 | S7 S6 S5 S4 |
|---|---|---|---|---|---|---|---|---|---|---|---|---|---|---|---|---|---|
| 0000 | * | C4 | C5 |  | C6 | 5 | 3 | 1 | C7 | 0 | 4 | 2 |  | TWO | TWO | TWO | |
| 0001 | C0 | 51 | 49 | 47 | 63 | 33 |  |  | 61 |  | 28 |  | 59 |  |  | TWO | |
| 0010 | C1 | 46 | 50 | 48 | 58 | 31 |  |  | 62 |  | 32 |  | 60 |  |  | TWO | |
| 0011 |  | TWO | TWO | TWO | TWO | 29 |  |  | TWO |  | 30 |  | TWO |  |  | TWO | |
| 0100 | C2 | 57 | 52 | TWO | 11 | 35 |  |  | 9 | 19 |  |  | 7 | 17 |  |  | |
| 0101 | 45 | 39 | 23 | 21 | 37 |  |  |  |  |  |  |  |  |  |  |  | |
| 0110 | 43 |  |  |  |  |  |  |  | 24 |  |  |  |  |  |  | TWO | |
| 0111 | 41 |  |  |  |  |  |  |  |  |  | 14 |  | TWO |  |  |  | |
| 1000 | C3 | 55 | 56 | TWO | 6 |  | 16 |  | 10 |  | 34 |  | 8 |  | 18 |  | |
| 1001 | 40 |  |  |  | 27 |  |  |  |  |  |  |  |  |  |  | TWO | |
| 1010 | 44 | 20 | 38 | 22 |  |  |  |  | 36 |  |  |  |  |  |  |  | |
| 1011 | 42 |  |  |  | 13 |  |  |  |  |  |  |  | TWO |  |  |  | |
| 1100 |  | 53 | 54 | TWO | TWO |  | TWO | TWO |  |  | TWO | TWO |  |  |  | TWO | |
| 1101 | TWO |  |  |  | 25 |  |  |  |  |  | 12 |  |  |  |  |  | |
| 1110 | TWO |  |  |  | 15 |  |  |  | 26 |  |  |  |  |  |  |  | |
| 1111 | TWO | TWO | TWO | TWO |  |  |  |  |  |  | TWO |  |  |  |  |  | |

*FIG. 9A*

| 2-ADJACENT BITS (B) | | SYNDROME BITS (B) (H) | 2-ADJACENT BITS (B) | | SYNDROME BITS (B) (H) |
|---|---|---|---|---|---|
| 0 | 1 | 1110 0000 = E0 | 32 | 33 | 1111 0000 = F3 |
| 2 | 3 | 1101 0000 = D0 | 34 | 35 | 1111 1100 = FC |
| 4 | 5 | 1111 0000 = F0 | 36 | 37 | 1100 1111 = CF |
| 6 | 7 | 1000 1100 = 8C | 38 | 39 | 0011 1111 = 3F |
| 8 | 9 | 0100 1100 = 4C | 40 | 41 | 0000 1110 = 0E |
| 10 | 11 | 1100 1100 = CC | 42 | 43 | 0000 1101 = 0D |
| 12 | 13 | 1111 0110 = F6 | 44 | 45 | 0000 1111 = 0F |
| 14 | 15 | 1111 1001 = F9 | 46 | 47 | 0010 0011 = 23 |
| 16 | 17 | 1011 1100 = BC | 48 | 49 | 0001 0011 = 13 |
| 18 | 19 | 0111 1100 = 7C | 50 | 51 | 0011 0011 = 33 |
| 20 | 21 | 0010 1111 = 2F | 52 | 53 | 0011 1000 = 38 |
| 22 | 23 | 0001 1111 = 1F | 54 | 55 | 0011 0100 = 34 |
| 24 | 25 | 1100 1011 = CB | 56 | 57 | 0011 1100 = 3C |
| 26 | 27 | 1100 0111 = C7 | 58 | 59 | 1000 0011 = 83 |
| 28 | 29 | 1111 0010 = F2 | 60 | 61 | 0100 0011 = 43 |
| 30 | 31 | 1111 0001 = F1 | 62 | 63 | 1100 0011 = C3 |

ERROR CORRECTION SYSTEM FOR N BITS USING ERROR CORRECTING CODE DESIGNED FOR FEWER THAN N BITS

BACKGROUND OF THE INVENTION

1. Field of the Invention

The invention relates to error detection and correction systems, and more particularly, to error detection and correction circuits for storage and retrieval of data in computer memories.

2. Description of the Related Art

Technology has advanced in recent years to provide faster and more powerful computers, and as the technology has progressed, programmers have developed applications to exploit the improved performance. As a result, modern applications perform a wide array of tasks, yet the programs are often quite user friendly due to advances in user interface systems and graphics-oriented applications.

Performance and user friendliness, however, have not been achieved without sacrifice. Versatile and friendly programs often require tremendous memory resources in the computer system to store the program and data. Consequently, computer systems generally include several Megabytes of random access memory (RAM) in which the microprocessor stores programs and data, and then reads the appropriate portions of memory as the program progresses.

To operate properly, of course, the data conveyed to and read from memory must be an accurate copy of the stored data. An assortment of factors, like faulty components or inadequate design parameters, may cause errors in the data used by the computer. As a memory system grows, more components are present and subject to failure, and the mean time between failures (MTBF) usually diminishes. Thus, in a large memory array, the potential frequency of errors becomes a significant hazard, and the errors are almost impossible to prevent.

To preclude corrupted data from use, manufacturers incorporate error detection and correction circuitry into computer memory systems. Numerous methods have been developed and implemented, but the simplest and most well-known error detection code is the single-bit parity code. To implement a parity code, a single bit is appended to the end of the data word stored in memory. For even parity systems, the value of the parity bit is assigned so that the total number of ones in the stored word, including the parity bit, is even. For odd parity, the parity bit is assigned so that the total number of ones is odd. When the stored word is read, if one of the bits is erroneous, the total number of ones in the word must change so that the parity value for the retrieved data does not match the stored parity bit. Thus, an error is detected by comparing the stored parity bit to a regenerated check bit calculated for the data word as it is retrieved from memory.

Although a single-bit parity code effectively detects single-bit read errors, the system has limits. For example, if two errors occur, the parity value for the data remains the same as the stored parity bit, because the total number of ones in the word stays odd or even. In addition, even though an error may be detected, the single-bit parity code cannot determine which bit is erroneous, and therefore cannot correct the error.

To provide error correction and more effective error detection, various error correction codes were developed which not only determine that an error has occurred, but also indicate which bit is erroneous. The most well-known error correction code is the Hamming code, which appends a series of check bits to the data word as it is stored. When the data word is read, the retrieved check bits are compared to regenerated check bits calculated for the retrieved data word. The results of the comparison indicate whether an error has occurred, and if so, which bit is erroneous. By inverting the erroneous bit, the error is corrected. In addition, a Hamming code detects two-bit errors which would escape detection under a single-bit parity system. Hamming codes can also be designed to provide for three-bit error detection and two-bit error correction, or any other number of bit errors, by appending more check bits. Thus, Hamming codes commonly provide greater error protection than simple single-bit parity checks.

Unfortunately, Hamming codes require several check bits to accomplish the error detection and correction. For example, an eight-bit data word requires five check bits to detect two-bit errors and correct one-bit errors. As the bus grows wider and the number of bits of transmitted data increases, the number of check bits required also increases. Because modern memory buses are often 64 or 128 bits wide, the associated Hamming code would be very long indeed, requiring considerable memory space just for the check bits. Consequently, using Hamming codes in large memory systems is expensive and consumes substantial memory resources.

A further problem is caused by modern RAM chips. In early memory systems, RAM chips were organized so that each chip provided one bit of data for each address. Current RAM chips, however, are frequently organized into sets of four bits of data for each address. If one of these RAM chips fails, the result is four potentially erroneous data bits. Unless the error correction code is designed for four-bit error detection or correction, a four-bit error may go completely undetected. Incorporating a four-bit error detection and correction code in a 64-bit or 128-bit memory system, however, would require numerous check bits and a substantial portion of the memory space. Consequently, to detect errors caused by a RAM chip failure while a program is in progress, designers have been forced to employ lengthy, memory-consuming check bit schemes, or simply hope that the erroneous data causes a system error or failure before any significant damage is done.

After the error is finally detected, the source of the error must be identified. Because the error may be undetected until a system error or failure occurs, the location of the faulty DRAM cannot ordinarily be determined without a hardware test of each memory module. In a large memory system, testing each individual module for operability is prohibitively costly due to repair costs and computer system down time, particularly if the error is intermittent.

SUMMARY OF THE INVENTION

A computer system according to the present invention includes an error detection and correction system for detecting and correcting single-bit errors, two-adjacent-bit errors, and four-adjacent-bit errors. In addition, if errors are caused by a faulty DRAM, a computer system according to the present invention determines the particular location identity of the failed DRAM module. In the preferred embodiment, a total of 16 check bits are used to detect and correct errors for a 128-data-bit wide memory. The system includes two identical error detection and correction (EDC) circuits connected to the system memory array. Each EDC circuit is connected to half of the data bits in alternating pairs, so that bits <0,1> are connected to the first EDC circuit, bits <2,3> are connected to the second EDC circuit, bits <4,5> are connected to the first EDC circuit, and so on.

When a data word and its associated check bits are read from the memory array, the EDC circuit generates a new set of check bits for the retrieved data word and compares the test check bits to the check bits retrieved from memory. In the preferred embodiment, each of the EDC circuits detects and corrects any single-bit error or any 2-adjacent-bits error among the bits it receives. Because the EDC circuits are connected to alternating pairs of data bits, errors of up to four adjacent bits may actually be detected and corrected, two bits by the first EDC circuit and two bits by the second. Thus, if one of the x4 DRAMs in a memory array fails, each erroneous data bit from the DRAM is corrected to its original value. If another error occurs in addition to the failed DRAM errors, the error may not be correctable. Nonetheless, the EDC circuit detects the error and indicates that a noncorrectable error has occurred, allowing the system to retransmit the data. Finally, because the computer system identifies the erroneous bits, the particular DRAM module generating the erroneous data may be identified.

BRIEF DESCRIPTION OF THE DRAWINGS

A better understanding of the present invention may be obtained when the detailed description of the preferred embodiment is considered in conjunction with the following drawings, in which.

DETAILED DESCRIPTION OF THE PREFERRED EMBODIMENT

Figure 1:
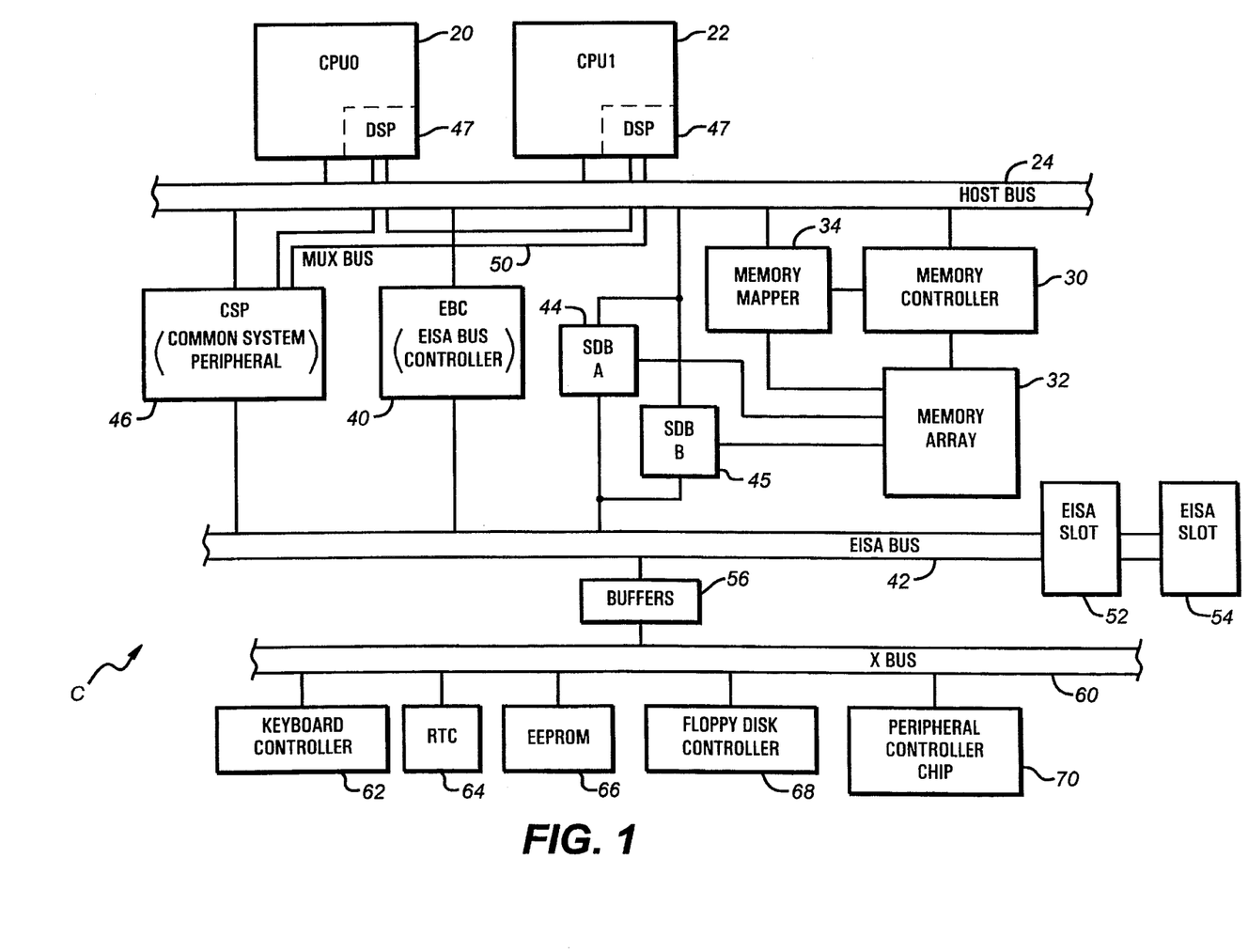
FIG. 1 is a block diagram of a multi-processor computer system incorporating the present invention.

Referring now to FIG. 1, a computer system C is shown. In the preferred embodiment, the computer system C is a multiprocessor system, although the present invention may be incorporated into single processor systems. The computer system elements that are not discussed in detail below are not significant to the present invention other than to illustrate the example of a fully configured computer system.

The computer system C includes two CPU boards referred to as CPU0 20 and CPU1 22 connected to a host bus 24. A memory controller 30 is coupled to the host bus 24. A main memory array 32, preferably comprised of 4-data-bit dynamic random access memory (x4 DRAM), is coupled to the memory controller 30. Memory mapper logic 34 is coupled to the host bus 24, as well as the memory controller 30 and the memory array 32. The memory mapper logic 34 provides memory mapping functions to facilitate memory accesses in the memory array 32. A bus controller 40, referred to as the EISA bus controller (EBC), is coupled between the host bus 24 and an expansion bus, preferably an Extended Industry Standard Architecture (EISA) bus 42. The EBC 40 provides various bus cycle translation and conversion functions to facilitate transfers between the host bus 24 and the EISA bus 42. A pair of system data buffers (SDBs) 44, 45 is also coupled between the host bus 24 and the EISA bus 42, which is discussed in detail below. A logic block referred to as the common system peripheral (CSP) 46 is coupled between the host bus 24 and the EISA bus 42. The CSP 46 is also coupled through a MUX bus 50 to a logic block referred to as the distributed system peripheral (DSP) 47 associated with each of CPU0 20 and CPU1 22. The CSP 46 includes various common system function circuitry, including a direct memory access (DMA) controller, EISA arbitration controller, and numerous system board logic functions such as refresh control. The CSP 46 receives interrupt signals from the various peripheral I/O devices and transmits these interrupt request signals to the DSP logic 47 in each of CPU0 20 and CPU1 22 via the MUX bus 50. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, which is hereby incorporated by reference. For more information on the CSP 46 and the DSPs 47, please see related copending application Ser. No. 07/955,683, now U.S. Pat. No. 5,436,792, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, which is hereby incorporated by reference.

The EISA bus 42 includes a plurality of EISA slots 52 and 54 for receiving EISA bus master expansion cards, for example, a network interface card, or a hard disk interface card. The EISA bus 42 is coupled through buffers 56 to a bus referred to as the X bus 60. A number of peripheral devices are coupled to the X bus 60, including a keyboard controller 62, a real time clock (RTC) 64, an electrically erasable programmable read only memory (EEPROM) 66, a floppy disk controller 68, and a peripheral controller chip 70 which includes numerous parallel ports and UARTs (universal asynchronous receiver/transmitters).

Figure 2:
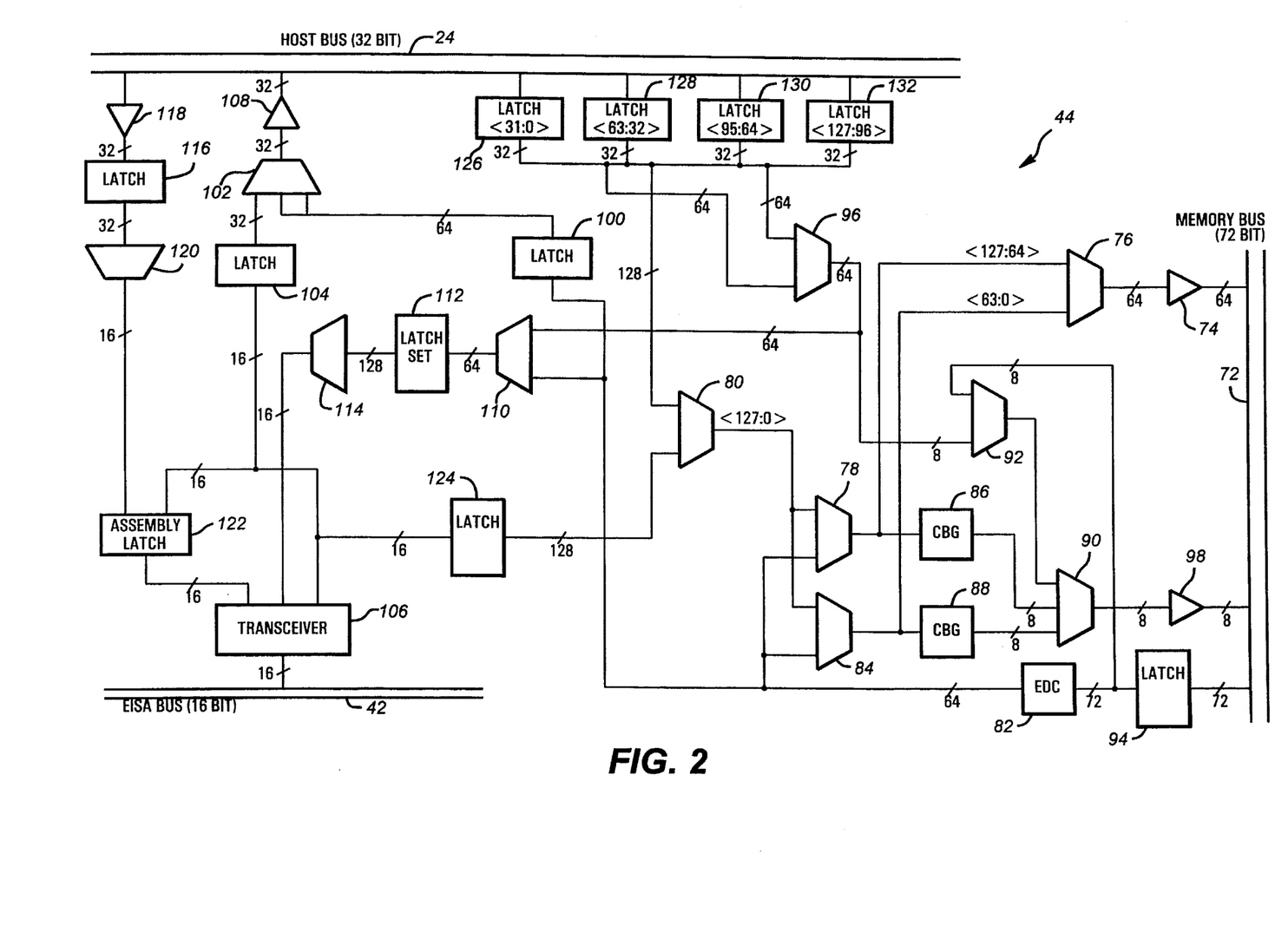
FIG. 2 is a block diagram of the Super Data Buffer (SDB) circuit of FIG. 1.

Check bit generators and error detection and correction logic reside in the two SDBs 44, 45. Referring now to FIG. 2, a block diagram of one of the two SDBs discloses the SDB interface of the host bus 24, the EISA bus 42, and a memory bus 72 connected to the main memory array 32. Data is transferred from bus to bus through the SDBs 44, 45 in data words generally 256 bits wide. Because each SDB 44, 45 transmits only half of the data, data words in each of the SDBs 44, 45 are 128 bits wide. For purposes of the disclosure, each SDB 44, 45 is identical except for the specific bus signals received and transmitted. For write operations to the memory 32, sixty-four bits of data are transferred to the memory bus 72 from the SDB 44 by a buffer 74 having its data input connected to the output of a multiplexer 76. The multiplexer 76 input is connected to the output of another multiplexer 78 which receives the upper 64 bits of data from another multiplexer 80 and 64 data bits transmitted by an EDC circuit 82. The second input of the first multiplexer 76 is connected to the output of another multiplexer 84 which receives the lower 64 bits of data from the multiplexer 80 and the 64 data bits from the EDC circuit 82, discussed in more detail below.

The 64-bit outputs of the multiplexers 78, 84 are also provided to a pair of check bit generators (CBGs) 86, 88. Each check bit generator 86, 88, discussed in more detail below, generates eight check bits based on the input data bits. The output of each check bit generator 86, 88 is provided to an input of another multiplexer 90, which has a third set of inputs connected to the output of a multiplexer 92. One of the multiplexer's 92 inputs is connected to the check bit output of a memory data read latch 94, described below, which receives the stored check bits for a data word when the word is read from memory. The multiplexer's 92 other input is connected to the lower eight output bits of a multiplexer 96 which receives the upper 64 bits of the host bus data at one set of inputs, and the lower 64 bits of the host bus data at another set of inputs. The multiplexer 96 permits particular bits to be provided to the check bit memory without accessing the data bits in the memory 32. This permits the check bit memory to be tested independently of the data memory. The output of the multiplexer 90 is provided to an 8-bit buffer 98. The output of the buffer 98 is connected to the memory bus 72 to store the check bits in the memory array 32.

During read cycles from memory 32, data and check bits read from the memory bus 72 are latched by a 72-bit latch 94. The latched data and check bits are then provided to the EDC circuit 82, which is discussed in detail below. The EDC circuit 82 detects errors and provides corrected data when data is retrieved from memory 32. To transmit data to the host bus 24 from the memory bus 72, the data is first provided to a 64-bit host-to-memory read latch 100, having the upper 32 bits of its output connected to a first set of inputs of a host bus data multiplexer 102, and the lower 32 bits connected to a second set of inputs of the host bus data multiplexer 102. The third set of inputs of the host bus data multiplexer 102 is connected to a 32-bit EISA bus-to-host read latch 104 which receives data from an EISA transceiver 106. The host bus data multiplexer 102 selects which 32 bits of data will be transmitted to a 32-bit buffer 108 having its output connected to the host bus 24 to drive data onto the host bus 24.

The output of the EDC circuit 82 is also provided to a EISA bus-to-memory read multiplexer 110 having two sets of inputs composed of 64 bits each. The first set of inputs receives data from the EDC circuit 82, and the other set of inputs receives data from the multiplexer 96. The output of the EISA bus-to-memory read multiplexer 110 is connected to the inputs of a set of EISA bus-to-memory read latches 112, which receive the data from the multiplexer 110 in sets of 64 bits. The latches 112 transmit the data to an EISA read multiplexer 114. The EISA read multiplexer 114 then transmits data to the EISA transceiver 106 in 16-bit sets. As the data is provided to the transceiver 106, the data is transmitted to the EISA bus 42.

The data from the EDC 82 is further provided to the multiplexers 78, 84 that drive data onto the memory bus 72. When a CPU 20, 22 or other bus master writes to memory 32, but not all of the bytes are valid, a read-merge-write command is executed. The data currently stored at the specified location in memory 32 is read, the retrieved data is partially overwritten by the data to be stored, and the merged data is finally presented on the memory bus 72. During a read-merge-write cycle, the check bit generators 86, 88 may be disabled and the check bits may be transferred from memory 32 to memory 32 without modification by switching the output of the multiplexers 90, 92 to transmit the latched check bits.

Data to be transferred from the host bus 24 to the EISA bus 42 is latched in a 32-bit host-to-EISA write latch 116 connected through a buffer 118 to the host bus 24. Data is then transmitted to a host-to-EISA write multiplexer 120, which transmits data to an EISA assembly latch 122 in 16-bit sets. The assembly latch 122 then transmits the data to the transceiver 106 to be provided to the EISA bus 42. The inputs of the assembly latch 122 are also connected to the outputs of the transceiver 106 for EISA byte assembly.

To transfer data from the EISA bus 42 to the host bus 24, data from the EISA bus 42 is collected by the transceiver 106 and provided in sets of 16 bits to the EISA bus-to-host read latch 104. The EISA bus-to-host read latch 104 is a 32-bit latch, which is connected to the third input of the host bus data multiplexer 102. As previously indicated, the multiplexer 102 transmits data to the host bus 24 through the 32-bit buffer 108.

Data to be transmitted to the memory bus 72 from the EISA bus 42 is loaded into the transceiver 106 and provided to a set of latches 124 in sets of 16 bits. When the transfer is complete, the 128-bit word is provided to the input of the multiplexer 80.

Similarly, data to be transmitted to the memory bus 72 from the host bus 24 is loaded in 32-bit sets into a set of four host-to-memory write latches 126, 128, 130, 132. The host-to-memory write latches 126, 128, 130, 132 receive data from the host bus 24 and transmit it to the second input of the multiplexer 80. Using the multiplexer's select input, the computer system C indicates which bus data is to be transferred to the memory bus 72.

For data retrieved from the memory 32, error detection and correction is performed by generating check bits for the data, storing the check bits along with the associated data, and comparing the retrieved check bits with regenerated check bits for the retrieved, potentially erroneous data. As data is transmitted to the memory bus 72, the upper 64 bits of data are provided to the first check bit generator 86, and the lower 64 bits of data are provided to the second check bit generator 88. The check bit generators 86, 88 generate sets of bits for the data received according to a particular algorithm. The check bits are stored in a memory location corresponding to the location of the data bits in memory 32. When the data and check bits are read from memory 32, a new set of check bits is regenerated by the EDC circuit 82 from the data and compared to the original check bits read from memory 32. If the check bits match, no error has been detected and the data is provided to the appropriate bus. If the check bits do not match, however, an error has been detected. In some cases, the error may be correctable by switching one or more data bits. In other cases, the error may not be correctable, so the data must be retransmitted or retrieved from another source.

Figure 3A:
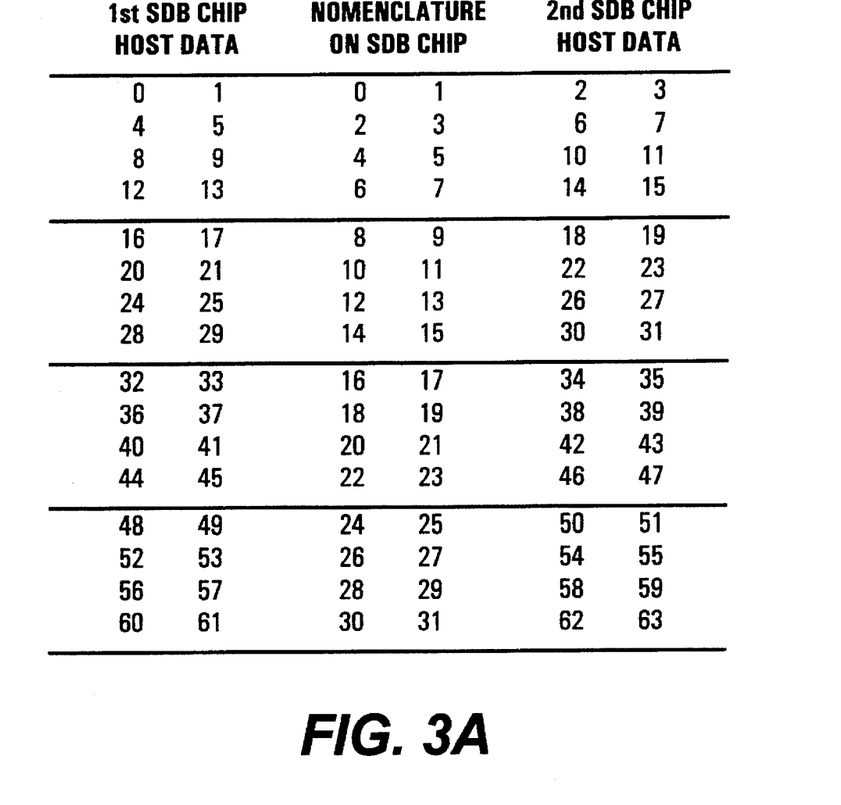
FIGS. 3A–3C are nomenclature tables for translating generic data bits designations for the SDB of the example to particular data bits for specific SDBS.
Figure 3B:
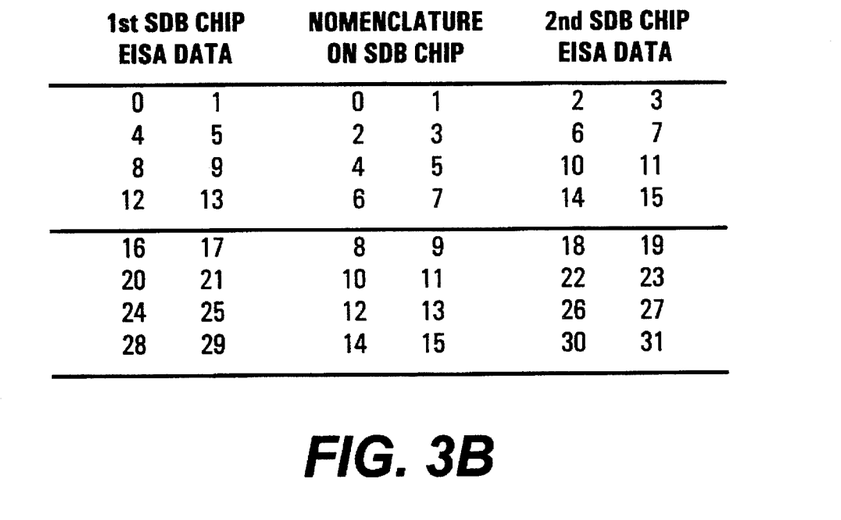
Figure 3C:
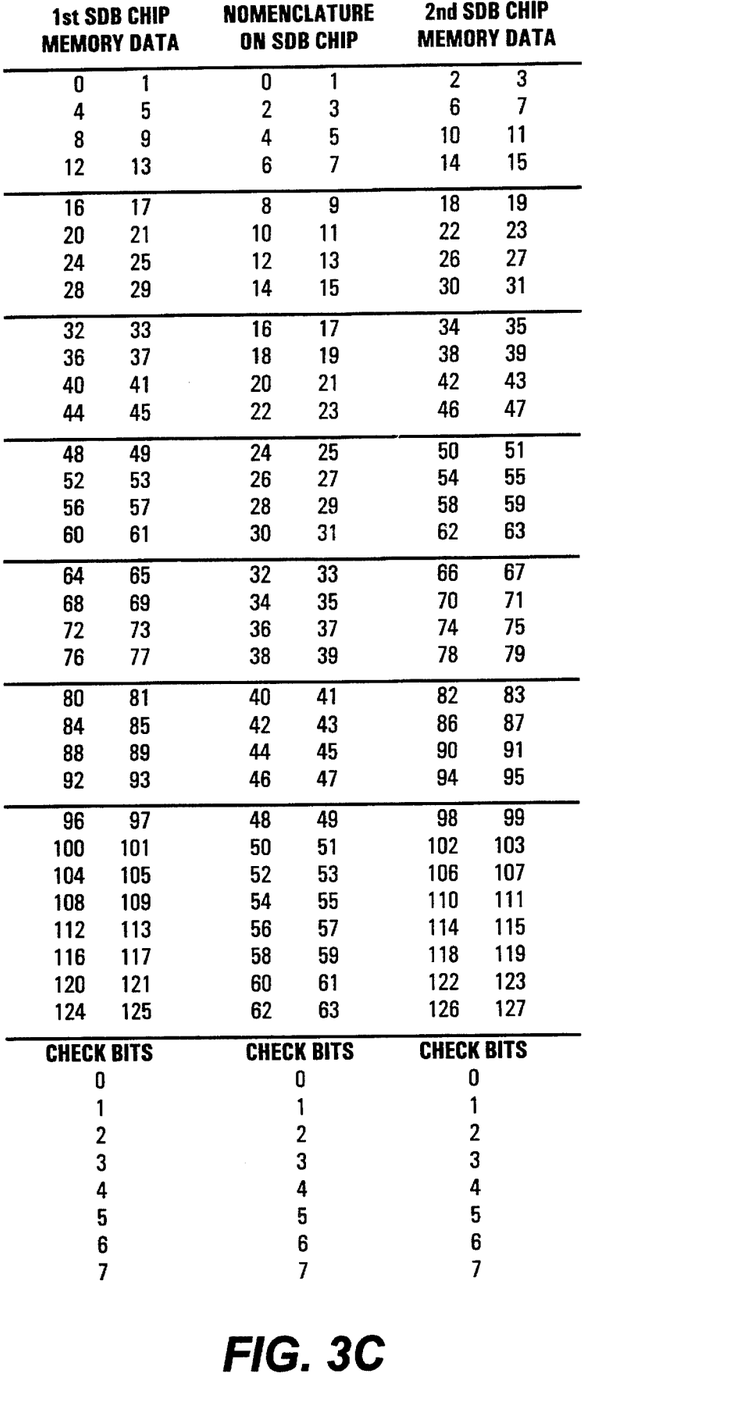
Figure 4:
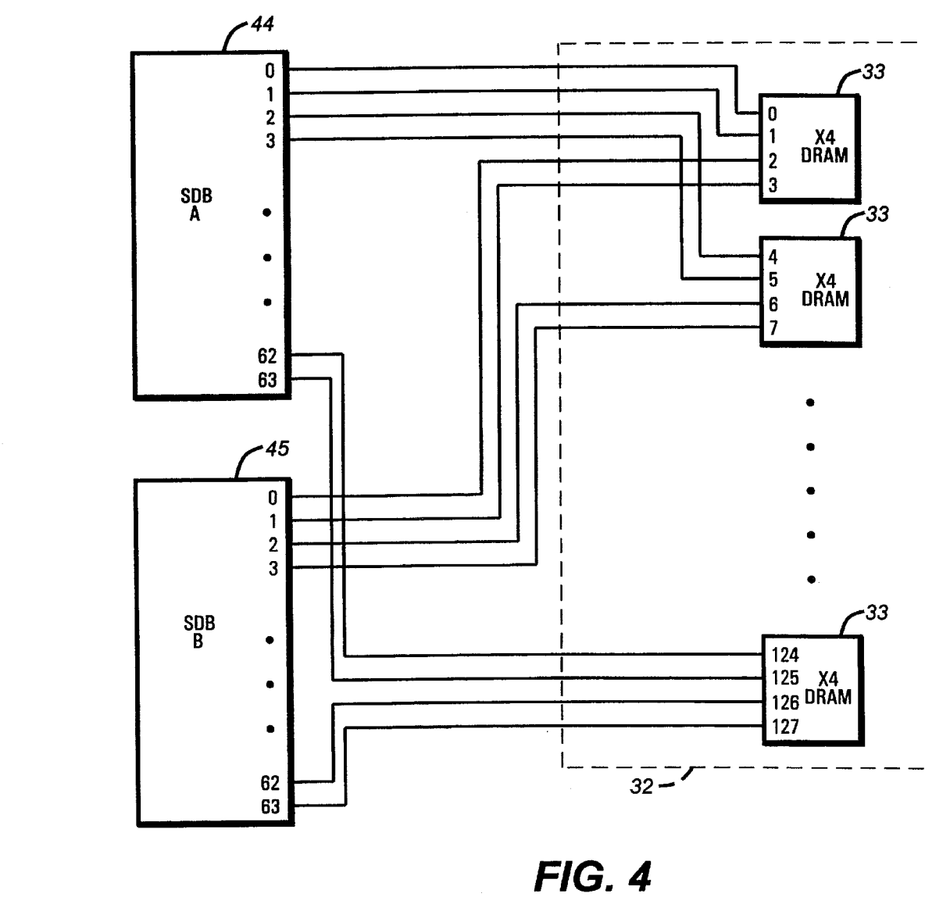
FIG. 4 is a block diagram illustrating the individual data connections between the SDBs and the memory array.

The computer system C of the preferred embodiment employs two SDBs 44, 45, each of which includes its own two check bit generators 86, 88. Because the SDBs 44, 45 are identical in every way except for the specific data bits processed, the operation and function of only one SDB is described except where necessary to identify a distinct function of a particular SDB. Thus, the nomenclature used for the generic SDB described herein and the corresponding nomenclature for the specific SDBs 44, 45 of the preferred embodiment are shown in FIG. 3A–3C. The host bus 24 data bits are split and provided to the individual SDBs 44, 45 as shown in FIG. 3A, and the EISA bus 42 data bits are similarly split as shown in FIG. 3B. Furthermore, the data transmitted to and received by the memory 32 through each SDB 44, 45 is split in the same way, as shown in FIG. 3C, to correspond to the data received from the host bus 24 and the EISA bus 42. Because the SDBs 44, 45 are connected to the memory array 32 by alternating pairs, each SDB 44, 45 communicates with two bits of each x4 DRAM module 33 in the memory array 32, as shown in FIG. 4. FIG. 4 illustrates the connections of alternating pairs of bits between each SDB 44, 45 and the individual DRAM devices 33. The connections shown in FIG. 4 correspond to the connections described in FIG. 3C. Although only two SDBs are shown in the preferred embodiment, any number of SDBs may be used to transfer data and detect errors. Similarly, although the preferred embodiment discloses connections in alternating pairs of data bits, any groups of adjacent bits, regardless of number, may be connected in alternating groups to the SDBs.

The computer system C of the preferred embodiment employs an error correction code that corrects not only single bit errors, but also two-bit errors for adjacent bits. One method for generating a two-adjacent-bits error correction code is disclosed in an article by D.C. Bossen, entitled "b-Adjacent Error Correction," published in the July, 1970, issue of the IBM Journal of Research and Development, at page 402, which is hereby incorporated by reference. The article describes a method for creating a b-adjacent error correction code, where b is a specific number of adjacent bits. In the present computer system, b equals 2. Thus, the error correction code detects single-bit errors as well as two adjacent erroneous bits. In FIG. 1 on page 403 of the Bossen article, a parity check matrix for a single-bit error and two-adjacent-bits error correction code is shown. The matrix functions for 64 data bits and generates eight check bits.

Figure 5:
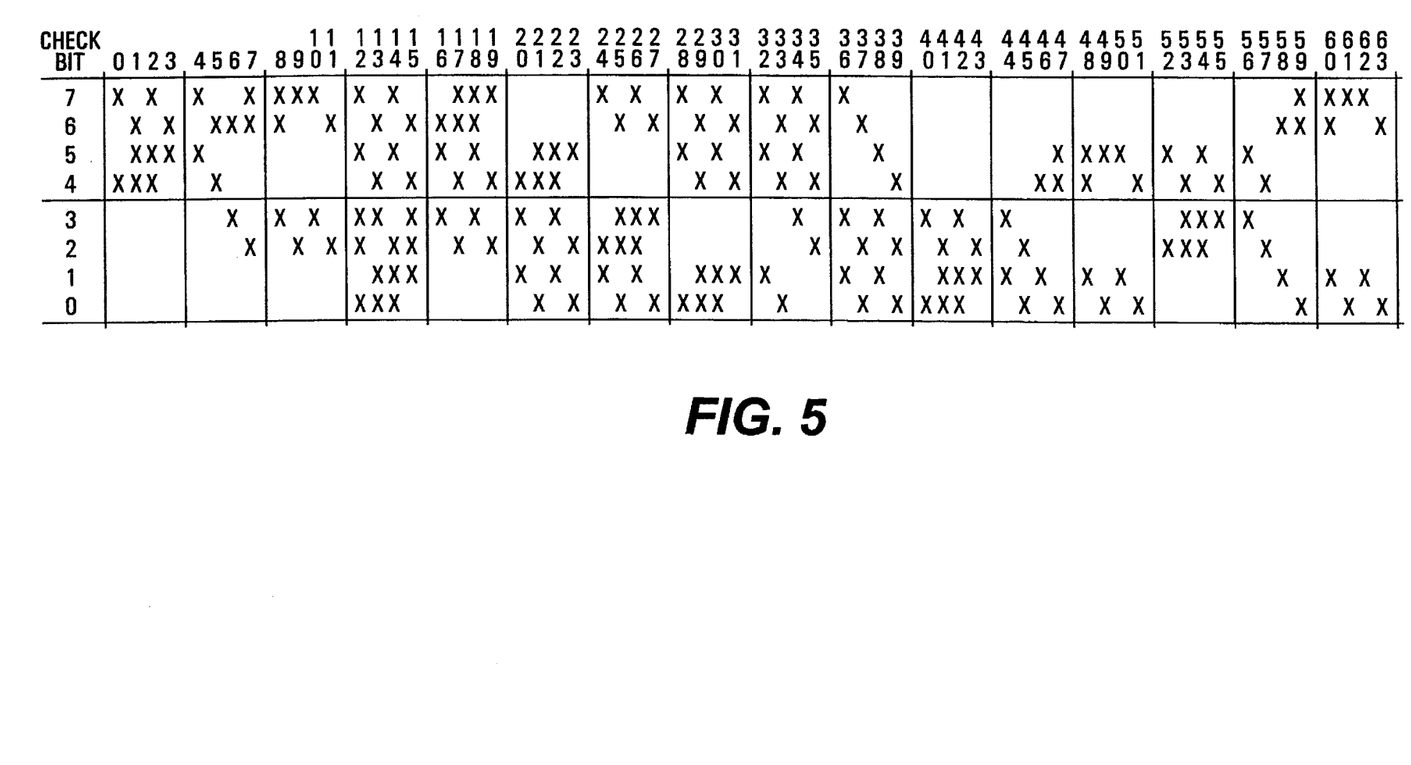
FIG. 5 illustrates a simplified matrix for identifying the relevant data bits for each check bit.

To implement the code, however, the parity check matrix must be converted into its binary form. On page 404 of the article, a transformation matrix is provided for each of the symbols in the parity check matrix. By substituting these matrices for the symbols in the parity check matrix, a binary matrix is created for the error correction code. This matrix is shown in FIG. 5 in simplified form so that all of the ones in the binary matrix have been replaced by Xs, and all of the zeros in the binary matrix have been replaced by spaces. An error correction code derived from this matrix generates a unique set of syndrome bits for each possible single-bit error or two-adjacent-bits error. By decoding the syndrome bits, single-bit and two-adjacent-bits errors may be corrected by inverting the values of the affected bits.

The binary matrix is implemented by assigning a check bit to correspond to each row of the binary matrix of FIG. 5. Check bits are generated by performing an exclusive OR (XOR) operation on all of the data bits marked with an X on a row. The result of the XOR operation is one of the eight check bits generated by the eight rows.

For example, to generate check bit <7>, an XOR operation is performed on the data bits marked with an X on the top row of the matrix, which corresponds to check bit <7>. For check bit <7>, the data bits of interest are data bits <0, 2, 4, 7, 8, 9, 10, 12, 14, 17, 18, 19, 24, 26, 28, 30, 32, 34, 36, 59, 60, 61, 62>. As indicated previously, the actual data bits used by each of the check bit generators is different due to the dual nature of the SDBs 44, 45. Thus, to get check bit <7>, the first SDB's 44 check bit generators perform the XOR operation on actual data bits <0, 4, 8, 13, 16, 17, 20, 24, 28, 33, 36, 37, 48, 52, 56, 60, 64, 68, 72, 117, 120, 121, 124>, which correspond to the generic SDB bit designations shown in FIG. 3C. The actual data bits for the second SDB's 45 check bit generators are similarly determined, using the data bits in the third column of FIG. 3C that correspond to the designated data bits for the check bit <7> row in FIG. 5.

Figure 6:
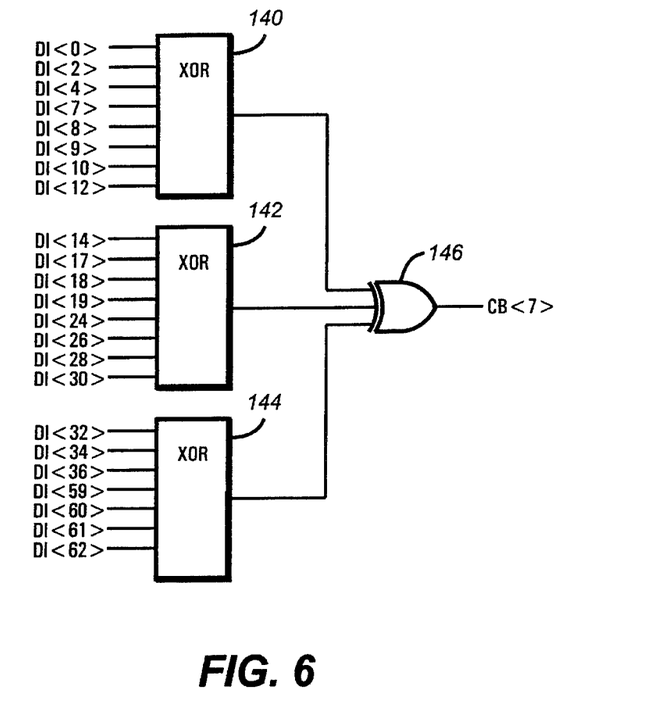
FIG. 6 is a circuit diagram illustrating the operation of a check bit generator.

The check bits are created by the check bit generators 86, 88, which implement in hardware the check bit generation process. As shown in FIG. 6, which illustrates a portion of a check bit generator for generating check bit <7>, this operation is performed in the preferred embodiment by multiple-input XOR gates 140, 142, 144 in the check bit generators 86, 88. Each of the check bits is generated by a separate set of XOR gates which receive the appropriate data bits as input. As discussed above, the specific data bits provided to each set of XOR gates 140, 142, 144 is determined by the matrix of FIG. 5. Because the multiple-input XOR gates 140, 142, 144 in the illustrated circuit have only eight inputs, the outputs of the multiple-input XOR gates 140, 142, 144 must be connected to the inputs of a three-input XOR gate 146 to complete the XOR operation, and the output of the three-input XOR gate 146 is check bit <7> for the check bits generator. A series of identical circuits, each having its input determined according to the matrix of FIG. 5, generates the remaining seven check bits. Each generated check bit is stored in memory 32 along with the associated data.

Figure 7:
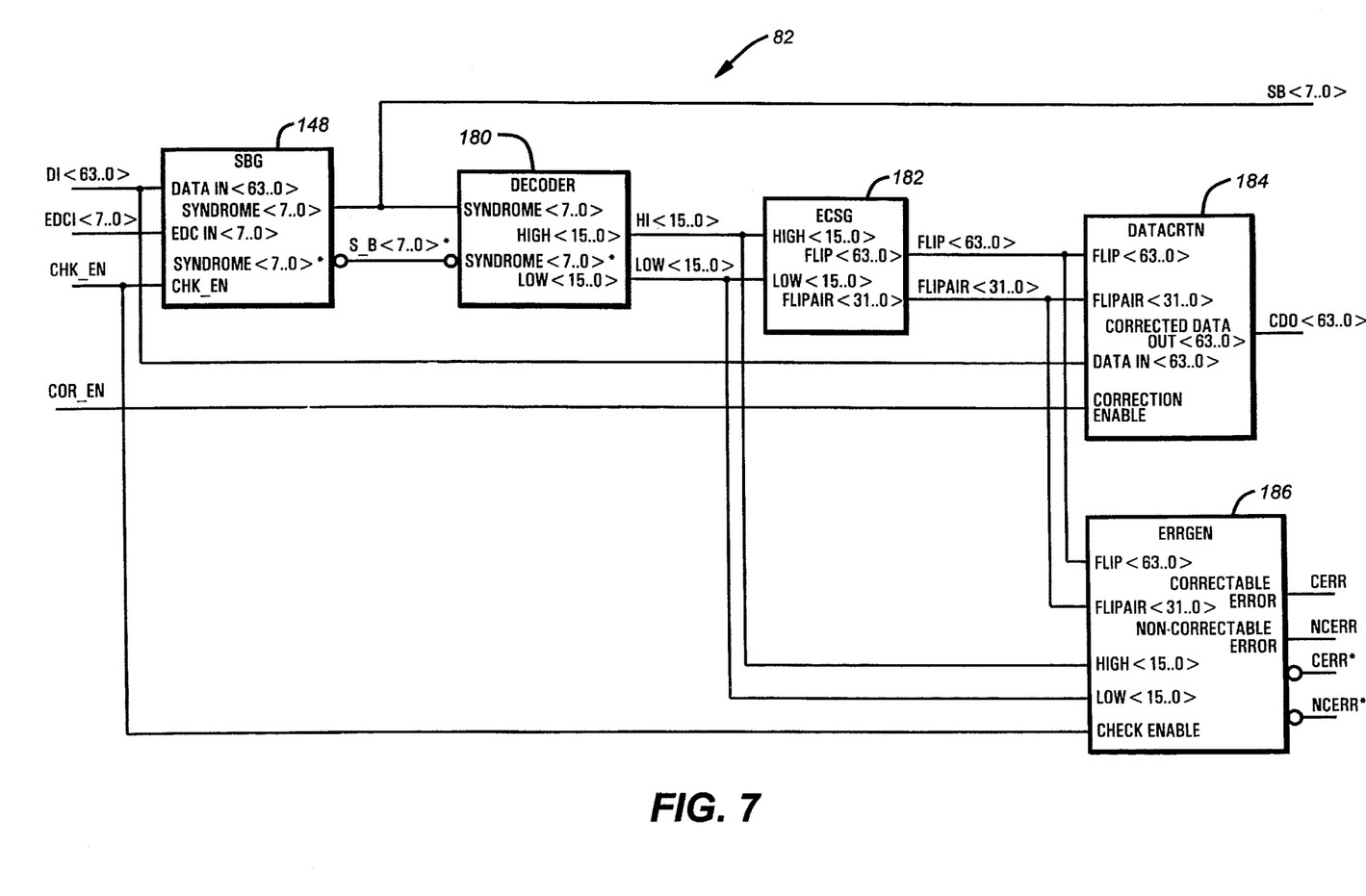
FIG. 7 is a block diagram of the error detection and correction circuitry.
Figure 8:
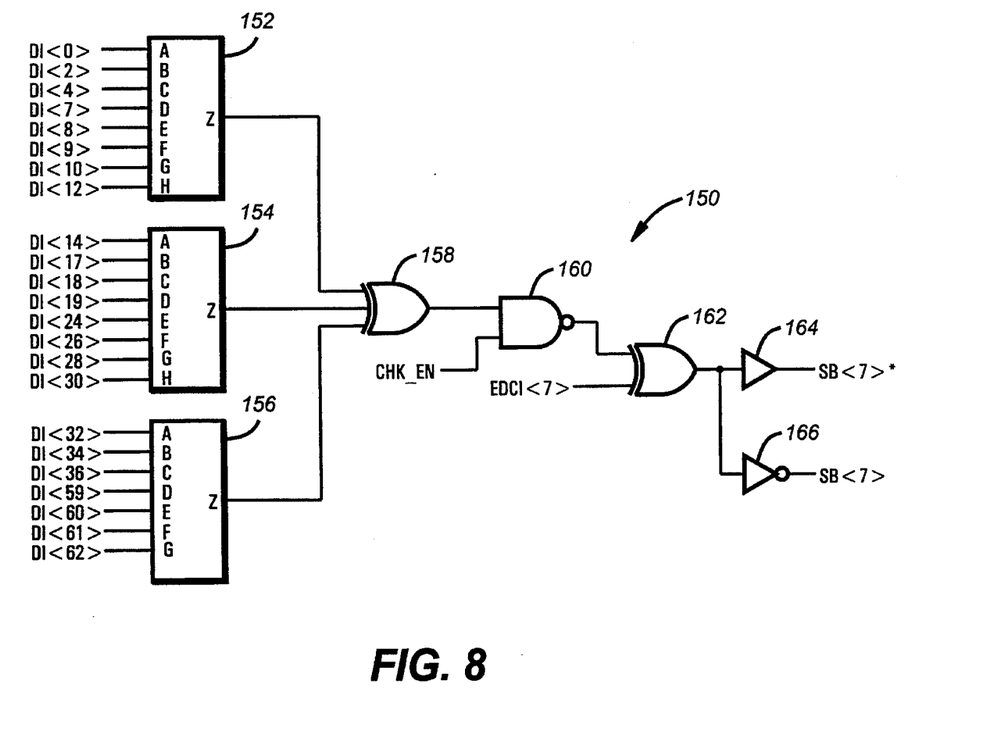
FIG. 8 is a circuit diagram illustrating the operation of a syndrome bit generator.

When the data is retrieved from memory, the EDC circuit 82 detects errors in the stored data bits using the stored check bits. The data bits and check bits are read at the same time from the memory array 32 and latched in the 72-bit latch 94. The EDC circuit 82, shown in the block diagram of FIG. 7, then receives the data bits and check bits from the latch 94, which are provided to a syndrome bits generator (SBG) 148. FIG. 8 discloses the details of a portion of the syndrome bits generator 148. The syndrome bits generator circuit 150 shown in FIG. 8 is one of eight syndrome bits generator circuits in the EDC 82. The XOR gate logic is identical to the logic of the check bits generators 86, 88, including the data bit connections, and performs precisely the same function for the data received from the memory bus 72 to generate test check bits. The data bits received from the memory bus 72 are provided to multiple input XOR gates 152, 154, 156, and the output of each XOR gate 152, 154, 156 is provided to the inputs of a three-input XOR gate 158. The output of the XOR gate 158, which is the test check bit, is then provided to the input of a two-input NAND gate 160 having its other input connected to a check enable (CHK_EN) signal. The check enable signal is generated by the computer system C to enable comparison of the received check bits to the test check bits. If the check enable signal is low, the comparison is disabled and the output of the NAND gate 160 is always 1. When the check enable signal is asserted high, the output of the NAND gate 160 follows the output of the three-input XOR gate 158, thus transmitting the test check bit.

The output of the NAND gate 160 is then provided to another XOR gate 162. The other input of the XOR gate 162 is connected to the check bit received from the memory bus 72. If the test check bit matches the check bit received from memory 32, the output of the XOR gate 162 is zero, and if the test check bit does not match, the output of the XOR gate 162 is one. The output of the XOR gate 162 is a syndrome bit, indicating whether there is an error related to one of the data bits tested by the syndrome bit generation logic 148. The output of the XOR gate 162 is provided to a buffer 164 and to an inverter 166 to provide both the syndrome bit and its inverse.

The syndrome bits generated by the syndrome bit generator 148 indicate whether an error has been detected, the type of error, and which bit or bits are erroneous. The syndrome bits are interpreted according to the table shown in FIG. 9A. If all of the syndrome bits are zeros, no error has been detected, which is indicated by the asterisk(*). Any other result among the syndrome bits indicates that an error has been detected. A number in the table indicates which data bit is erroneous for a single-bit correctable error. If the number is preceded by a C, the erroneous bit is a check bit. Where the word TWO is shown, the combination of syndrome bits indicates that a two-adjacent-bits correctable error has occurred. The table shown in FIG. 9B indicates which two adjacent bits are erroneous. For the remaining boxes in the table shown in FIG. 9A, if only a space is shown, a non-correctable error has occurred. A non-correctable error can occur where more than two adjacent bits are erroneous in the tested bits or where multiple non-adjacent bits are erroneous. It should be noted that it is possible for non-adjacent bit or multiple bit failures to falsely indicate a correctable error or even no error at all. Nonetheless, it is believed that multiple bit errors, other than complete device failures, are extremely rare and would most likely be detected as some sort of failure.

Figure 9A:
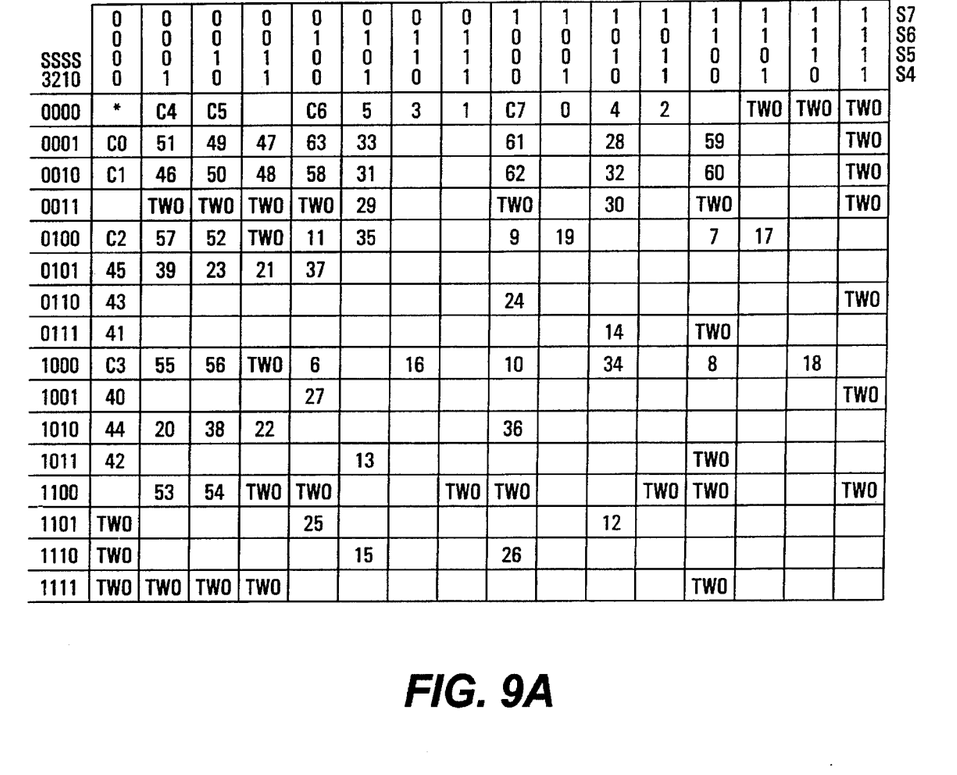
FIGS. 9A and 9B are tables for interpreting syndrome bits to identify erroneous data and check bits.
Figure 9B:
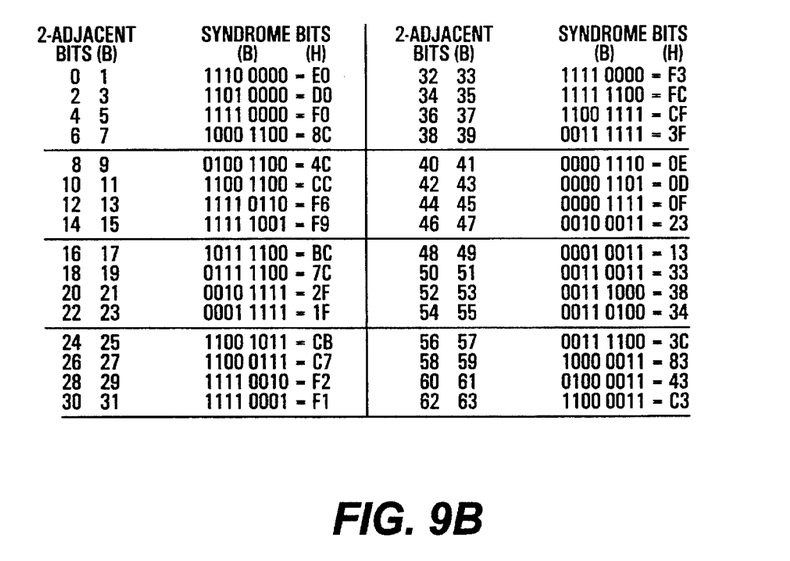

Using the syndrome bits in conjunction with the table shown in FIGS. 9A and 9B, errors in the received data may be detected. In particular, if a single bit or two adjacent bits are erroneous, the error is detected and its location is identified by the tables in FIG. 9A and 9B. Because two SDBs 44, 45 are independently checking different sets of data, up to four adjacent erroneous bits may be detected. For example, if one of the x4 RAM chips in the memory system 32 fails, up to four bits of the received word may be erroneous. If the failed x4 RAM chip contained data bits <0 . . . 3> of the original 128 bits, errors in bits 0 and 1 are detected by the first SDB 44, and errors in bits 2 and 3 are detected by the second SDB 45. If each bit is erroneous when provided to the SDB, each 2-adjacent-bits error is detected by the SDBs because the bits are adjacent. As a result, the failure of an entire x4 RAM chip may be detected and, as indicated below, the data may be corrected to its original form. Thus, a 4 bit adjacent error can be addressed and corrected using only a 2-bit adjacent error code.

To implement the corrections, the syndrome bits received from the syndrome bits generator 148 are provided to a decoder unit 180. The decoder unit 180 receives the syndrome bits and translates them into a binary representation indicating which bit or bits may be in error. In the preferred embodiment, the decoder unit 180 includes two 4-bit to 16-bit decoders. The first decoder receives the four upper syndrome bits and the second decoder receives the four lower syndrome bits. Thus, the decoder unit 180 provides a 32-bit output, split into 16 high bits and 16 low bits. The syndrome bit signals are provided to the decoder unit 180 so that every possible combination of syndrome bits causes one and only one of the upper decode bits to be asserted, and causes one and only one of the lower decode bits to be asserted.

Figure 10A:
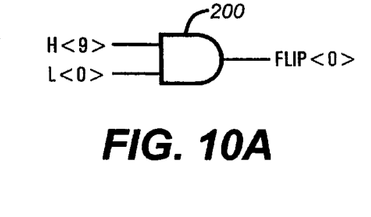
FIGS. 10A and 10B are diagrams of logic gates illustrating the operation of an error correction signal generator.
Figure 10B:
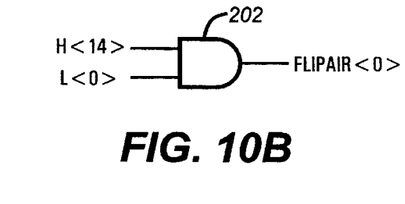

The decoder unit 180 signals are then provided to an error correction signal generator (ECSG) 182. The error correction signal generator 182 implements the syndrome bits table of FIG. 9A, comprising a collection of AND gates like the AND gates 200, 202 in FIGS. 10A and 10B, to indicate which erroneous data bit or pair of adjacent bits should be inverted. One AND gate corresponds to each and every correctable error for a data bit or pair of data bits shown in FIGS. 9A and 9B on the syndrome bits tables. For example, an AND gate 200 for data bit <0> is shown in FIG. 10A, which receives the decoder unit's 180 HIGH <9> and LOW <0> signals. If both signals are asserted by the decoder unit 180, an error has occurred in data bit <0>. Similarly, as shown in FIG. 10B, the AND gate 202 for data bit pair <0> receives the decoder unit's 180 HIGH <14> and LOW <0> signals, and if both are asserted at the same time, an error has occurred in both bits of pair <0> and both must be corrected.

Thus, if the decoded signals indicate that a correctable error has occurred, one of the AND gates asserts a signal indicating that a particular data bit or pair of adjacent data bits must be inverted. Because each SDB checks 64 individual bits and 32 pairs of bits, the error correction signal generator 182 generates one FLIP signal for each data bit to indicate whether that data bit should be inverted, and one FLIPAIR bit for each of the 32 pairs to indicate whether one of the pairs should be inverted.

Figure 11:
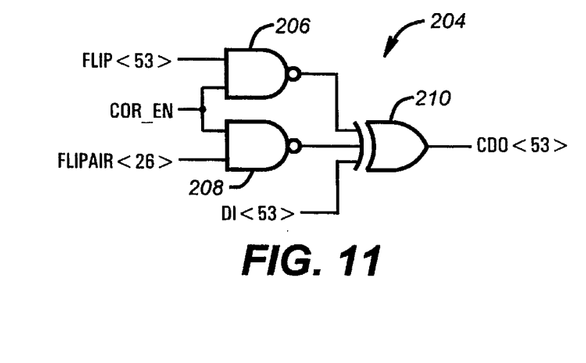
FIG. 11 is a diagram of a logic circuit illustrating the operation of a data correction circuit.

The error correction signals are provided to a data correction (DATA CRTN) circuit 184, which also receives the data bits received from the memory 32. A set of sixty-four circuits, one corresponding to each of the data bits, inverts the data values when appropriate. One of the inversion circuits 204 is shown in FIG. 11, and includes two NAND gates 206, 208, comprising a first NAND gate 206 which receives the FLIP signal for the single data bit, and a second NAND gate 208 which receives the FLIPAIR signal for the pair to which the data bit belongs. Each NAND gate 206, 208 also receives a correction enable (COR_EN) signal generated by the computer system C to enable the correction circuit 204. When the correction enable signal is not asserted, data received from memory 32 passes through the SDB 44 without correction. The output of each NAND gate 206, 208 is provided to an input of a three-input XOR gate 210. The third input of the three-input XOR gate 210 is connected to the data bit received from the memory system 32. If either the FLIP signal or the FLIPAIR signal is asserted when the correction enable signal is asserted, the XOR gate 210 inverts the value for the data bit received from memory 32, providing a corrected data bit. If neither error correction signal is asserted when the correction enable signal is asserted, or if the correction enable signal is not asserted, the output of the XOR gate 210 follows the value asserted at the data bit input. The outputs of all of the data correction circuits form the corrected 64-bit data word.

Figure 12:
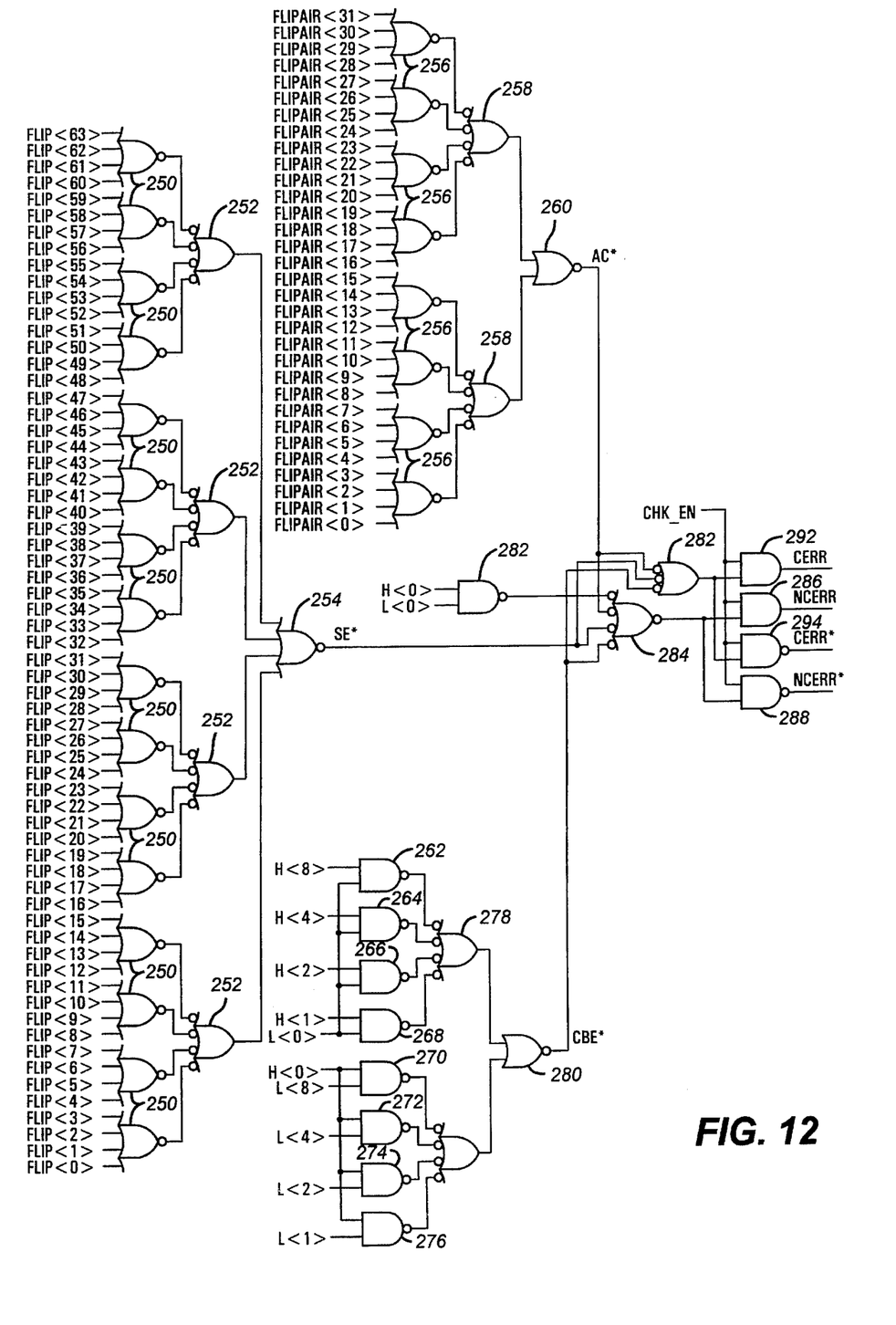
FIG. 12 is a circuit diagram illustrating the operation of an error type indicator circuit.

The error correction signals are also provided to an error type indicator (ERRGEN) circuit 186. The error type indicator circuit 186 also receives some of the decoder bits and the check enable signal from the computer system C, and the logic of the error type indicator circuit is illustrated in FIG. 12. The error type indicator circuit 186 generates two signals, and their respective inverse signals, to indicate whether a detected error is correctable (CERR) or non-correctable (NCERR). Sixteen four-input NOR gates 250 receive the FLIP signals, and the output of each of these NOR gates 250 is provided to one of the inputs of a set of four 4-input NAND gates 252. The output of the NAND gates 252, in turn, is connected to the inputs of a 4-input NOR gate 254. If any one of the FLIP signals is asserted, the output of the final NOR gate 254 is driven low, indicating that a single-bit error has occurred (SE*). Similarly, each of the FLIPAIR signals is provided to an input of one of eight 4-input NOR gates 256. The output of each NOR gate 256 is provided to an input of a 4-input NAND gate 258, and the output of each NAND gate 258 is provided to an input of a final NOR gate 260. If one of the FLIPAIR signals is asserted, the output of the final NOR gate 260 is driven low, indicating a two-adjacent-bits error (AC*).

Another circuit in the error type indicator circuit 186 includes eight NAND gates, the first four of which 262, 264, 266, 268 receive the decoder unit's 180 HIGH <8, 4, 2, 1> signals at first inputs. The second input of each of the NAND gates 262, 264, 266, 268 is connected to the decoder's 180 LOW<O> signal. Similarly, the second four NAND gates 270, 272, 274, 276 have one input connected to the LOW <8, 4, 2, 1> signals, respectively. The second input of each NAND gate 270, 272, 274, 276 is connected to the HIGH <0> signal. As illustrated by the syndrome bits table, these signals indicate whether one of the check bits is erroneous. If one of the check bits is erroneous, the corresponding NAND gate's output is driven low. The output of each NAND gate 262, 264, 266, 268, 270, 272, 274, 276 is provided to an input of a four-input NAND gate 278, and the output of each NAND gate 278 is then provided to an input of a two-input NOR gate 280. When the output of any one of the NAND gates 262, 264, 266, 268, 270, 272, 274, 276 is driven low, the output of the NOR gate 280 is also driven low, indicating a check bit error (CBE*).

The decoder unit's 180 HIGH <0> bit and LOW <0> bit are further provided to a two-input NAND gate 282. If both of these bits are asserted, the test check bits are identical to the original check bits, indicating that no error has been detected. Thus, the output of the NAND gate 282 is low when no error has been detected. The output of the NAND gate 282 is provided to a four-input AND gate 284, along with the single bit data error (SE*), two adjacent bits error (AC*) and check bit error (CBE*) signals. The output of the AND gate 284 is provided to an input of an AND gate 286 generating the non-correctable error (NCERR) signal, and an input of a NAND gate 288 generating the inverse of the non-correctable error (NCERR*) signal. If an error is detected corresponding to one of the designated correctable errors or no error at all in the syndrome bits table of FIG. 9A, one of the four signals provided as an input to the AND gate 284 drives the output of the AND gate 284 low. On the other hand, if the syndrome bits indicate an error corresponding to one of the empty boxes in FIG. 9A, a non-correctable error has been detected by the system. Thus, the output of the AND gate 284 is driven high. If the check enable signal has been driven high at the same time, the non-correctable error (NCERR) signal is asserted by AND gate 286, and its inverse (NCERR*) is driven low by NAND gate 288.

The single data bit error, check bit error, and two adjacent bits error signals are provided to the inputs of a three-input NAND gate 290. If any of these three signals is asserted low, the output of the NAND gate 290 is driven high, indicating that a correctable error has occurred. The output of the NAND gate 290 is provided to an input of a two-input AND gate 292, and an input of a two-input NAND gate 294. The second inputs of the AND gate 292 and the NAND gate 294 are connected to the check enable signal. If the output of the NAND gate 290 is driven high at the same time that the check enable signal is asserted, the correctable error (CERR) signal is driven high by AND gate 292, and its inverse (CERR*) is driven low by NAND gate 294.

When an error occurs, the computer system C of the present embodiment stores various data regarding the error so that the cause of the error may be analyzed. Both the CERR signal and the NCERR signal are provided to the CSP 46, which controls the interrupts to the various CPUs 20, 22 in the computer system C. If the CERR signal is asserted, the CSP 46 asserts an interrupt request (IRQ) signal, indicating that a correctable error has occurred. When the interrupt is acknowledged, a software interrupt routine determines the proper procedure for informing the operator of the error. Similarly, when a non-correctable error occurs, the CSP 46 initiates a non-maskable interrupt (NMI) to indicate to the proper CPU that the data retrieved from memory is unreliable. The NMI software routine also determines the proper course of action following a non-correctable error.

In the preferred embodiment, when either the CERR signal or the NCERR signal is asserted, the syndrome bits are stored in a diagnostic register in the SDB 44, 45 that generated them. The register includes a series of other diagnostic bits, including a bit which indicates whether the error occurred during a read cycle or a read-merge-write cycle. The type of transaction associated with the error provides useful information regarding whether the error is still present in memory 32. The syndrome bits remain in the diagnostic register until they are read by a CPU 20, 22. By examining the syndrome bits, the system may be able to diagnose the cause of the problem and warn the operator.

In particular, the syndrome bits may indicate the presence of a faulty DRAM. Errors of more than a single bit, especially repetitive errors for a group of four data bits associated with a particular DRAM module, strongly indicate a faulty DRAM. When the errors detected by the EDC circuit 82 indicate that a DRAM has failed, the CPU 20, 22 determines the location of the failed DRAM from the syndrome bits. Because the syndrome bits usually indicate the identities of the erroneous bits, a software table lookup may be executed by the CPU 20, 22 to identify the DRAM module associated with the erroneous bits. Consequently, the operator may determine the exact DRAM module to replace to repair the memory system 32.

Furthermore, the identity of the faulty DRAM may be determined by the CPU 20, 22 by reading the syndrome bits from the diagnostic register. As described above, the syndrome bits may be used to identify the individual erroneous data bits. The particular bank in the memory array 32 is designated by the memory mapper 34. Using a software table lookup, the CPU 20, 22 correlates the bank and data bits to a specific DRAM chip. This chip may then be replaced to repair the system memory 32.

The foregoing disclosure and description of the invention are illustrative and explanatory, and various changes in the size, shape, materials, components, circuit elements, wiring connections and contacts, as well as in the details of the illustrated circuitry and construction and method of operation, may be made without departing from the spirit of the invention.

We claim:

1. A computer memory system, comprising:

a multiple-bit bus;

a memory array connected to the bus; and an error detection system, wherein said error detection system includes:

a first error detection circuit connected to a first set of alternating groups of adjacent bits of said bus;

a second error detection circuit connected to a second set of alternating groups of adjacent bits of said bus;

a first error correction circuit responsive to said first error detection circuit for correcting errors detected by said first error detection circuit; and a second error correction circuit responsive to said second error detection circuit for correcting errors detected by said second error detection circuit;

wherein each of said error correction circuits is capable of correcting a two-adjacent-bits error and a single bit error.

2. The computer memory system of claim 1, wherein said error detection system further comprises:

means for determining whether a detected error is correctable; and means for indicating whether said detected error is correctable.

3. The computer memory system of claim 2, wherein said error detection system further comprises:

means for determining whether an error is a two-adjacent-bits error; and means for indicating whether said error is a two-adjacent-bits error.

4. A computer memory interface between a memory array storing data words n bits wide and m check bits utilized with said data words, and a computer bus n data bits wide, comprising:

a memory bus having n bits connected to the n data bits and m bits connected to the m check bits of the memory array;

a plurality of check bit generator circuits, each check bit generator circuit providing less than n data bits and m check bits based on the data bits provided by that check bit generator circuit to said memory bus and receiving less than n data bits from the computer bus, wherein the sum of the number of data bits provided to the memory bus by all of said check bit generator circuits equals n, the sum of the number of check bits provided to the memory bus by all of said check bit generator circuits equals m, and the sum of the number of data bits received by all of the check bit generator circuits equals n;

a plurality of error detection circuits, each error detection circuit receiving less than n data bits and less than m check bits from said memory bus and providing less than n data bits to the computer bus, wherein the sum of the number of data bits received from the memory bus by all of said error detection circuits equals n, the sum of the number of check bits received from the memory bus by all of said error detection circuits equals m, and the sum of the number of data bits provided to the computer bus by all of said error detection circuits equals n, and wherein each said error detection circuit detects single-bit errors, two-adjacent-bits errors and other errors; and a plurality of error correction circuits connected between said error detection circuits and the computer bus, each said error correction circuit providing less than n data bits to the computer bus and receiving less than n data bits from one of said error detection circuits, wherein the sum of the number of data bits received from all of the error detection circuits by all of the error correction circuits equals n, and the sum of the number of data bits provided to the computer bus by all of said error correction circuits equals n, and wherein each said error correction circuit corrects single-bit and two-adjacent-bits errors detected by each said error detection circuit and provides corrected data to the computer bus.

5. The computer memory interface of claim 4, wherein:

each of said check bit generator circuits provides data bits to alternating pairs of data bits of said memory bus and receives data bits from alternating pairs of data bits of the computer bus; and each of said error detection circuits receives data bits from alternating pairs of bits of said memory bus.

6. The computer memory interface of claim 5, wherein each of said error detection circuits comprises:

a syndrome bit generator receiving said alternating pairs of data bits and said check bits from said memory bus, wherein said syndrome bit generator generates test check bits based upon said received data bits, compares said received check bits with said test check bits, and generates syndrome bits based upon the comparison of said received check bits and said test check bits; and decoding means connected to said syndrome bit generator and receiving said syndrome bits for decoding said syndrome bits to determine whether an error has occurred and to determine which of said bits is erroneous if an error has occurred and is correctable.

7. The computer memory interface of claim 6, wherein each of said error correction circuit comprises:

an error correction signal generator circuit connected to said decoding means, wherein said error correction signal generator circuit generates a correction signal for each bit or pair of bits determined to be erroneous by said decoding means; and a correction circuit responsive to said error correction signal generator circuit for correcting each bit or pair of bits indicated to be erroneous by said error correction signals.

* * * * *